Sept. 26, 1939.   P. W. GAENSSLE   2,174,070
WHEEL MOUNTING
Filed Jan. 21, 1938

Inventor
PAUL W. GAENSSLE,
John P. Tarbox
Attorney

Patented Sept. 26, 1939

2,174,070

UNITED STATES PATENT OFFICE 2,174,070

WHEEL MOUNTING

Paul W. Gaenssle, Detroit, Mich., assignor to Budd Wheel Company, Philadelphia, Pa., a corporation of Pennsylvania Application January 21, 1938, Serial No. 186,013

4 Claims. (Cl. 301—36)

This invention relates to vehicle wheels and more particularly to demountable dual wheel constructions for motor vehicles.

The invention consists in providing a dual wheel construction with detachable annular wheel bodies adapted to carry on their outer peripheries the tires, and adapted to be detachably connected near their inner peripheries to the hub of the wheel.

The wheel bodies are preferably made of resilient metal, such as steel, and are dished axially so as not only to secure a suitable resiliency of the metal bodies against axial strains, but also to enable the wheel bodies carrying the tires to be mounted in pairs, side by side, on the same hub of a wheel, if desired. The wheel discs are detachably connected to the hub by suitable fastening devices, such as bolts or studs and nuts, so that the wheel discs either with or without tires thereon may be readily applied to or removed from the hub of the wheel.

More particularly, the present invention is concerned with a dual wheel construction of this kind and has for its main object to provide a dual disc wheel having interchangeable inner and outer wheel discs identical in shape and dimensions and capable of being mounted together without sacrificing the interchangeability of all accessory mounting elements.

Another object is to provide a strong driving connection between the wheel discs and between the discs and the wheel hub, while at the same time relieving the mounting bolts and fastening nuts of shearing stresses.

Still another object is to provide for improved centering of the wheel discs.

Figure 1:
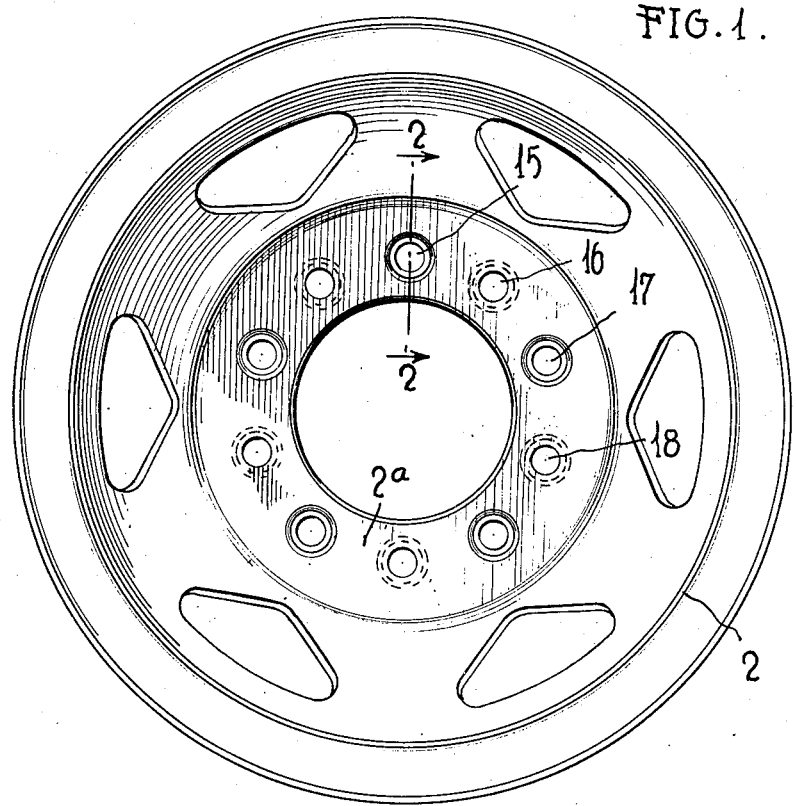
Figure 2:
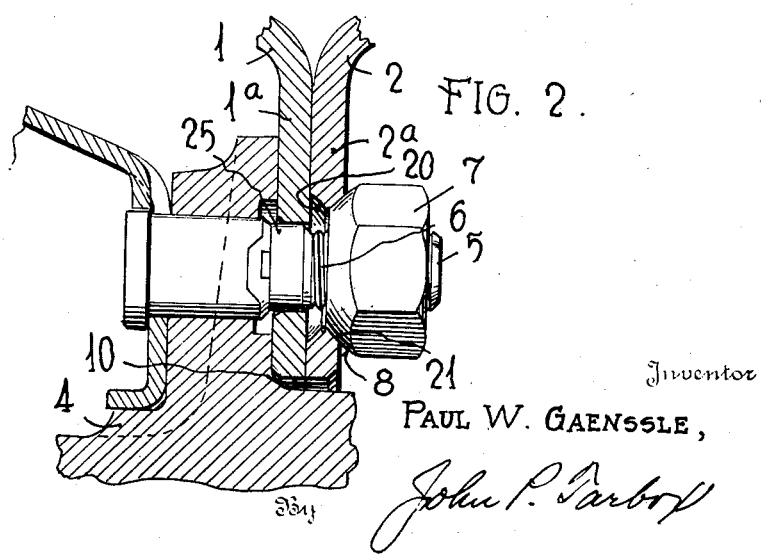

The invention will be more fully understood after reference to the accompanying drawing, in which like parts are indicated by similar reference symbols throughout the several views, and in which:

Figure 1 shows a side elevation of a wheel construction embodying the invention; and Figure 2 is a cross-section on the line 2—2 of Figure 1.

Throughout the description it is intended that the inner wheel body denotes that body which is axially innermost of the dual wheel assembly. It is that wheel body which lies adjacent to the hub flange, and might also be termed the inboard wheel body. The term outer wheel body denotes that body which is axially outermost of the dual wheel assembly.

As illustrated, 1 and 2 are respectively the inner and outer wheel bodies forming the dual wheel assembly. They are disc wheels, each preferably formed in the same manner as the other to be interchangeable. They are each dished axially throughout a portion of their bodies and are planar in their portions 1a and 2a, the better to enable them to be mounted in pairs, side by side, on the same hub.

Referring more particularly to Figure 2, the wheel discs 1 and 2, shown only partially, are mounted adjacent to the flange 3 of the wheel hub 4. The flange is annular and is preferably formed integrally with the hub. Studs or bolts 5 are mounted on a common bolt or stud circle, and are secured to the hub flange 3 in a way common to the art. The stud or bolt is threaded at 6, upon which threads is placed the securing nut 7. Each securing nut is fashioned with a convex or ball-face 8.

Each wheel disc is provided with a central opening through which the hub 4 extends in spaced relation to said wheel discs. It is to be particularly noted that the hub 4 does not serve as a wheel-center seat, but that there is deliberately provided a sufficient clearance 10 so that at all times, the wheel discs are spaced from the hub. The preservation of this space is important in that, from a manufacturing standpoint, it is impossible to hold dimensions so closely that the wheel bodies would not ride either on the hub or on the studs and hub. In the construction shown herein, the wheel discs are entirely free of the hub barrel and ride solely upon the studs and nuts.

Coming now to the gist of the invention and viewing Figure 1 in particular, each disc in the region of the bolting-on holes 15, 16, 17, 18, etc., is so constructed that the holes are alternately large and small. The centers of all of the holes lie on the same circle and the holes are equally spaced. Hole 15 is larger in diameter than hole 16 and furthermore the hole 15 is provided with ball seats 20 and 21, providing concave sockets, in effect. Hole 17 has the same dimensions as hole 15 and likewise, alternate holes around the disc are large, like hole 15. Holes 16 and 18, and other alternate holes are small holes and are not provided with concave seats. The holes have a diameter substantially the diameter of the unthreaded portion 25 of the bolting-on stud 5. In other words, each disc in the portion of the wheel body known as the bolting-on flange portion is provided with a plurality of holes; being alternately large and small, the small holes fitting the bolt or stud. In the construction shown, there are twice as many holes as there are bolting-on studs.

The respective wheel discs 1 and 2 are mounted on the bolts by placing the disc 1 so that small holes take the bolts 5 and large holes in disc 2 take the bolts 5. Therefore, when the discs lie side by side, as in Figure 2, the small hole of disc 1 will be directly behind the large hole of disc 2 and this condition will recur alternately, around the discs, as they are shown mounted in Figure 2. Consequently, disc 1 is supported and centered by the bolt 5 and disc 2 is supported and centered by the nut 7 and the ball-face 8 when said ball-face engages the concave seat 21, upon tightening the nut.

In the construction shown herein, ten holes are provided in each disc and there are five bolts or studs. This dual wheel mounting is perhaps better suited for heavy duty wheels but it is not to be so limited.

It is to be understood, however, that the description and drawings are for the purpose of illustration and example only, and are not to be taken as limiting the scope of this invention. Such limitation is to be only by the prior art, and by the terms of the appended claims.

I claim:

1. A vehicle wheel comprising a hub having an annular flange, a plurality of screw-threaded bolts carried by and projecting substantially equal distances from the face of said flange, a pair of annular dished wheel discs, each provided with a central planar portion surrounding a central opening through which the hub barrel extends in spaced relation to said wheel discs and a plurality of concave sockets centrally perforated and positioned at equal distances from the center of said disc alternating with a plurality of smaller bolt holes positioned at equal distances from the center of said disc and the same distance as said concave sockets, said discs being reversely mounted with respect to said hub with said bolts extending through said smaller bolt holes in the inner disc, which holes approximate the diameters of the portions of the bolts with which they engage, and said concave sockets in the outer disc so that the innermost wheel disc is centered by said bolts and the outermost wheel disc is centered by a plurality of similar ball-faced nuts threaded on said bolts and engaging in the concave sockets of the outermost wheel disc, the inner and outer discs being interchangeable.

2. A vehicle wheel comprising a hub having an annular flange, a plurality of screw-threaded bolts carried by and projecting substantially equal distances from the face of said flange, a pair of annular dished wheel discs, each provided with a central planar portion surrounding a central opening through which the hub barrel extends in spaced relation to said wheel discs and a plurality of concave sockets centrally perforated and positioned at equal distances from the center of said disc alternating with a plurality of smaller bolt holes positioned at equal distances from the center of said disc and the same distance as said concave sockets, said discs being reversely mounted with respect to said hub with said bolts extending through said smaller bolt holes in the inner disc, which holes approximate the diameters of the portions of the bolts with which they engage, and said concave sockets in the outer disc so that the bolt holes of the innermost wheel disc are centered directly behind the concave sockets of the outermost wheel disc, said innermost wheel disc being centered by said bolts and said outermost wheel disc being centered by a plurality of similar ball-faced nuts threaded on said bolts and engaging in the concave sockets of the outermost wheel disc, the inner and outer discs being interchangeable.

3. A vehicle wheel comprising a hub having an annular flange, a plurality of screw-threaded bolts carried by and projecting substantially equal distances from the face of said flange, a pair of annular dished wheel discs, each provided with a central planar portion surrounding a central opening through which the hub barrel extends in spaced relation to said wheel discs and a plurality of concave sockets centrally perforated and positioned at equal distances from the center of said disc alternating with a plurality of smaller bolt holes positioned at equal distances from the center of said disc and the same distance as said concave sockets, the number of said bolts being one-half the combined number of said bolt holes and said concave sockets, said discs being reversely mounted with respect to said hub with said bolts extending through said smaller bolt holes in the inner disc, which bolt holes approximate the diameters of the portions of the bolts with which they engage, and said concave sockets in the outer disc so that the bolt holes of the innermost wheel disc are centered directly behind the concave sockets of the outermost wheel disc, said innermost wheel disc being centered by a plurality of similar ball-faced nuts threaded on said bolts and engaging in the concave sockets of the outermost wheel disc, the inner and outer discs being interchangeable.

4. A vehicle wheel comprising a hub having an annular flange, a plurality of screw-threaded bolts carried by and projecting substantially equal distances from the face of said flange, a pair of annular dished wheel discs, each provided with a central planar portion surrounding a central opening through which the hub barrel extends in spaced relation to said wheel discs and a plurality of concave sockets centrally perforated and positioned at equal distances from the center of said disc alternating with a plurality of smaller bolt holes positioned at equal distances from the center of said disc and the same distance as said concave sockets, the number of said bolts being one-half the combined number of said bolt holes and said concave sockets, said discs being reversely mounted with respect to said hub with said bolts extending through said smaller bolt holes in the inner disc, which bolt holes approximate the diameters of the portions of the bolts with which they engage, and said concave sockets in the outer disc so that the bolt holes of the innermost wheel disc are centered directly behind the concave sockets of the outermost wheel disc, said innermost wheel disc being centered by a plurality of similar ball-faced nuts threaded on said bolts and engaging in the concave sockets of the outermost wheel disc and clamp said wheel discs against said hub flange, the inner and outer discs being interchangeable.

PAUL W. GAENSSLE.